US010628882B1

(12) United States Patent
Casey et al.

(10) Patent No.: US 10,628,882 B1
(45) Date of Patent: Apr. 21, 2020

(54) CUSTOMIZED LOAN PROGRAM DETERMINATION SYSTEMS

(71) Applicant: Capital One Services, LLC, McLean, VA (US)

(72) Inventors: Kristina Whitcomb Casey, McLean, VA (US); Paul David Quinn, Jr., McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/374,203

(22) Filed: Apr. 3, 2019

(51) Int. Cl.
*G06Q 40/02* (2012.01)
*G06N 5/02* (2006.01)

(52) U.S. Cl.
CPC ............. *G06Q 40/025* (2013.01); *G06N 5/02* (2013.01)

(58) Field of Classification Search
CPC .............................. G06Q 40/02; G06Q 40/025
USPC .......................................................... 705/38
See application file for complete search history.

(56) References Cited

U.S. PATENT DOCUMENTS

| | | | |
|---|---|---|---|
| 7,974,895 B1 | 7/2011 | Allen et al. | |
| 8,069,112 B2 | 11/2011 | Hankey et al. | |
| 8,355,983 B1 | 1/2013 | Parr et al. | |
| 8,392,294 B2* | 3/2013 | MacInnis | G06Q 40/025 705/28 |
| 2008/0015954 A1* | 1/2008 | Huber | G06Q 10/087 705/28 |
| 2012/0284173 A1* | 11/2012 | Monjanel | G06Q 40/02 705/38 |

OTHER PUBLICATIONS

NPL Search Results by EIC, dated Sep. 4, 2019. (Year: 2019).*

* cited by examiner

*Primary Examiner* — Hai Tran
(74) *Attorney, Agent, or Firm* — Troutman Sanders LLP; Christopher J. Forstner; John A. Morrissett (57) ABSTRACT

A loan determination system configured to determine and provide customized loans to an auto dealership based on iteratively updated dealership loan tiers (using predictive modeling that factors in performance of the specific dealership and others for a particular type of loan), a current dealership state, and input from the dealership. The system may analyze the success rates of various loan programs of one or more dealerships, build predictive models in order to determine a dealership state and associated loan tier, and recommend a particular loan program to the dealership based on the determination. Based on the dealership making a loan program selection and updated performance data, the predictive model data is updated and used to determine a new dealership state. Accordingly, the system may react to changes in dealership performance by recommending loan programs associated with a different loan tier.

20 Claims, 5 Drawing Sheets

CUSTOMIZED LOAN PROGRAM DETERMINATION SYSTEMS

FIELD OF THE INVENTION

The presently disclosed subject matter relates generally to loan determination systems, and more particularly to customized loan generation and determination systems capable of receiving model data representing automotive dealership behavior to define predictive models used to determine a dealership state, generate a new loan program or modify an existing loan program as appropriate, redefine a plurality of loan tiers each including one or more loan programs, and provide a customized loan program recommendation to a particular automotive dealership based on the dealership state and a determined loan tier for the dealership.

BACKGROUND

Traditionally, financial service providers offer various types of loan packages to automotive dealerships who, in turn, offer customer-specific dealer financing packages to potential customers wishing to purchase a car. A dealership may prefer a specific type or tier of loans (e.g., prime instead of subprime) from the financial service provider in order to maximize dealer profits (e.g., if the dealer sells new versus used cars, tends to make more money off of add-ons, etc.), while a financial service provider must balance its loan package offerings based on the risk that the particular dealership presents. With several factors, many of which are dynamic as performance metrics continue to update, to balance for financial service providers and dealerships alike, identifying a suitable loan type can present a significant challenge.

Accordingly, there is a need for improved loan determination systems to conveniently and accurately provide automotive dealerships with dealership-specific loan packages recommendations based on up-to-date dealership performance. Embodiments of the present disclosure are directed to this and other considerations.

SUMMARY

Consistent with a disclosed embodiment, a system and method for providing a loan package recommendation to an automotive dealership is disclosed. The system may include one or more processors and a memory in communication with the one or more processors and storing instructions that, when executed by the one or more processors, are configured to cause the system to perform operations consistent with disclosed embodiments. For example, in some embodiments, the system may receive, from one or more source systems, model data representing auto finance dealership behavior. The model data may also represent loan programs offered by the dealership systems, including data associated with the outcome of offering a particular program. Model data may be received from a dealership system associated with a dealership, or from a financial service provider that provides loan programs to a dealership. The system may define one or more predictive model systems based at least in part on one or more predictive variables.

After defining the predictive model system(s), the system may determine a current dealership state of a first dealership system associated with a first dealership based on the predictive model systems, and the current dealership state may be associated with a first loan tier of a plurality of loan tiers. The system may identify one or more loan recommendations associated with the first loan tier based on the one or more predictive model systems and the current dealership state of the first dealership system and transmit the one or more loan program recommendations to the first dealership system.

After providing the loan program recommendation(s) to the first dealership system, the system may receive a first selection of a loan program from the first dealership and may update the model data based on the first selection. The system may redefine the one or more predictive model systems to take into account the updated model data to form one or more first redefined predictive model systems, and determine a next dealership state of the first dealership system based on the one or more first redefined predictive model systems. The next dealership state of the first dealership may be associated with an alternate first tier of the plurality of loan tiers.

The system may be configured to interact with a plurality of dealerships. For example, the system may determine a current dealership state of a second dealership system associated with a second dealership based on one or more redefined predictive model systems and the current dealership state of the second dealership system is associated with the first loan tier of the plurality of loan tiers. The system may identify one or more loan program recommendations associated with the first loan tier based on the one or more first redefined predictive model systems and the current dealership state of the second dealership system. The system may transmit the one or more loan program recommendations to the second dealership, receive a second selection of a loan program from the second dealership, and update the first model data on the second selection to form second model data. The system may redefine the one or more first predictive model systems with the second model data to form one or more second redefined predictive model systems. The system may further determine a next dealership state of the second dealership system, with the next dealership state being associated with an alternate second tier of the plurality of loan tiers.

Consistent with the disclosed embodiments, methods for providing a loan package recommendation to an automotive dealership are also disclosed.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

The accompanying drawings, which are incorporated and constitute a part of this specification, illustrate various embodiments and aspects of the disclosed embodiments and, together with the description, serve to explain the principles of the disclosed embodiments. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Generally, the disclosed embodiments relate to systems and methods for providing a loan determination system for providing optimized loan program recommendations, and more specifically, providing a predictive model system for providing customized loan program recommendations to dealerships based on model data, and then updating the predictive model system with updated model data based on a dealership selection of a recommended loan program.

In one aspect, a system for providing optimized loan program recommendations is disclosed. Specifically, the system may include one or more memory devices storing instructions, and one or more processors configured to execute the instructions to perform the steps of a method. The system may receive, from one or more source systems, model data representing auto finance dealership behavior. For example, the model data may include statistics representing the relative profitability and success rate of each offered loan program. Using the received model data, the system may define one or more predictive model systems based at least in part on one or more predictive variables.

The system may further determine a current dealership state of a first dealership system associated with a first dealership based on the one or more predictive model systems, the current dealership state of the first dealership system associated with a first loan tier of a plurality of loan tiers. The one or more predictive model systems may evaluate risk associated with a dealership and make the current dealership state determination based on the overall risk associated with offering a particular loan program at a particular dealership. Each loan tier of the plurality of loan tiers may be associated with a risk level assigned to a current dealership state. The system may identify one or more loan program recommendations associated with the first loan tier based on the one or more predictive model systems and the current dealership state of the first dealership system, and transmit the one or more loan program recommendations to the first dealership system.

In response to transmitting the one or more loan program recommendations, the system may receive a first selection of the loan program from the first dealership. The system may update the model data based on the first selection to form first model data. The first model data may include updated evaluation on the risk level associated with the first dealership based on factors such as overall share of prime and subprime loans that the dealership offers, and the average default rate of a customer of the first dealership. The system may redefine the one or more predictive model systems based on the updated first model data to form one or more first redefined predictive model systems. The one or more first redefined predictive model systems may be based off the updated first model data in order to capture the latest trends in dealership performance.

Responsive to forming the one or more first redefined predictive model systems, the system may determine a next dealership state of the first dealership system based on the one or more first redefined predictive model systems. The next dealership state of the first dealership system may be associated with an alternate first tier of the plurality of loan tiers. The alternate first tier of the plurality of loan tiers may correspond to a loan program of the same or a similar risk level as compared with a loan program offered in the first tier of the plurality of loan tiers. The system may further determine a current dealership state of a second dealership system associated with a second dealership based on the one or more first redefined predictive model systems. The system may take into account the latest behavior of the first dealership system when defining the first redefined predictive model systems that are used to determine the current dealership state of the second dealership system. The current dealership state of the second dealership system may be associated with the first loan tier of the plurality of loan tiers. Accordingly, the current dealership state of the second dealership system may correspond to a similar risk level as any other dealership system associated with the first loan tier of the plurality of loan tiers.

The system may identify one or more loan program recommendations associated with the first loan tier based on the one or more first redefined predictive model systems and the current dealership state of the second dealership system and transmit the one or more loan program recommendations to the second dealership system. In response, the system may receive a second selection of the loan program from the second dealership. The system may update the first model data based on the second selection to form second model data. The system may redefine the one or more first redefined predictive model systems based on the updated second model data to form one or more second redefined predictive model systems, which take into account the latest behavior of the one or more dealership systems. The system may determine a next dealership state of the second dealership system based on the one or more second redefined predictive model systems, wherein the next dealership state of the second dealership system is associated with an alternate second tier of the plurality of loan tiers.

In some embodiments, the one or more predictive model systems, the one or more first redefined predictive model systems, and the one or more second redefined predictive model systems may each include a dealership risk predictive model, a geographic model, and a prime loan eligibility model. In some embodiments, the prime eligibility model may be based at least in part on a contract pull-through rate predictive variable.

In some embodiments, the next dealership state of the one or more of the first and the second dealership systems may be based at least in part on which loan program the dealership selects. In other words, the one or more predictive model systems may dynamically respond to the decisions made by both the dealerships and the customers of the dealerships.

In some embodiments, determining a current dealership state further includes determining a dealership rank score for each of the one or more predictive model systems and the one or more first redefined predictive model systems. The current dealership state may be determined based in part on the dealership rank score for each of the one or more predictive model systems and the one or more first redefined predictive model systems. Determining the next dealership state of the one or more of the first and second dealership systems may further include determining an updated dealership rank score for each of the one or more first redefined predictive model systems, and the one or more second redefined predictive model systems.

In another embodiment, the system may be further configured to determine a current dealership state of a third dealership system associated with a third dealership based on the one or more second redefined predictive model systems. The current dealership state of the third dealership system may be associated with a third tier of the plurality of loan tiers. The system may identify one or more loan program recommendations associated with the third loan tier based on the one or more second redefined predictive model systems and the current dealership state of the third dealership system. Further, the system may transmit the one or more loan program recommendations to the third dealership system and receive a third selection of a loan program from the third dealership. Responsive to the selection from the third dealership, the system may update the second model data based on the selection to form third model data. The system may redefine the one or more second redefined predictive model systems based on the third model data to form one or more third redefined predictive model systems. The system may determine a next dealership state of the third dealership system based on the one or more third redefined predictive model systems. The next dealership state of the third dealership system may be associated with the alternate first tier of the plurality of loan tiers. Accordingly, the one or more third redefined predictive model systems may determine that the third dealership system has lowered in risk based on dealership and customer behavior, and may now make loan program recommendations associated with the alternate first tier of the plurality of loan tiers.

In another aspect, a loan determination system is disclosed. Specifically, the system may include one or more memory devices storing instructions, and one or more processors configured to execute the instructions to perform the steps of a method. The system may receive, from one or more source systems, model data representing auto finance dealership behavior. The system may define one or more predictive model systems based at least in part on one or more predictive variables. The system may determine a dealership rank score of the first dealership system associated with the first dealership for each of the one or more predictive model systems. The system may determine a current dealership state of the first dealership system associated with the first dealership. The current dealership state may be determined based at least in part on the dealership rank score of the first dealership system and the current dealership state of the first dealership system associated with a first loan tier of a plurality of loan tiers. The system may identify at least two loan program recommendations associated with the first loan tier and transmit the at least two loan program recommendations to the dealership system. The system may receive a selection of a loan program from the first dealership and may use the selection to update the model data representing auto finance dealership behavior. The system may redefine the one or more predictive model systems based on the updated model data to form one or more first redefined predictive model systems. The system may determine an updated dealership rank score of the first dealership system associated with the first dealership. The updated dealership rank score may be based at least in part on the updated model data and the one or more first redefined predictive model systems. The system may determine the next dealership state of the first dealership system based at least on the updated dealership rank score. The next dealership state of the first dealership system may be associated with an alternate second tier of the plurality of loan tiers.

In some embodiments, the one or more predictive model systems and the one or more first redefined predictive model systems may include a dealership risk predictive model, a geographic model, and a prime loan eligibility model. The dealership risk predictive model may include one or more predictive variables including the prime share of all loan packages offered by the dealership system, the state in which the dealership operates, the subprime share of all loan packages offered by the dealership system, the overall approval rate of all loan packages offered by the dealership system, and the mean loan to value of all of the offered loan packages of the dealership system (LTV). The geographic model may include one or more predictive variables including a local financial service provider market share, a local auto sales tax rate, a local sales price to book value ratio, and a local backend product penetration rating. The prime eligibility model may include one or more predictive variables including the financial service provider contract pull through rate, the financial service provider application approval rate, a maximum warranty rate, a maximum front-end rate, and a franchise of a plurality of franchise types associated with a dealership. In some embodiments, the next dealership state of the dealership system is based at least in part on which loan program the dealership selects.

In some embodiments the system may further determine a current dealership state of the second dealership system associated with the second dealership based on the one or more predictive model systems. The current dealership state of the second dealership system may be associated with a second loan tier of the plurality of loan tiers. The system may identify one or more loan program recommendations associated with the second loan tier based on the one or more predictive model systems and the current dealership state of the second dealership system. The system may transmit the one or more loan program recommendations to the second dealership system. The system may receive a selection of a loan program from the second dealership, the selection being used to update the model data representing auto finance dealership behavior. The system may redefine the one or more first predictive model systems based on the model data in order to form the one or more second redefined predictive model systems. The system may determine a next dealership state of the second dealership system based on the one or more second redefined predictive model systems. The next dealership state of the second dealership system may be associated with the alternate second tier of the plurality of loan tiers.

In some embodiments, the at least two loan program recommendations are identified by storing each loan program recommendations using the one or more predictive model systems, the one or more first redefined predictive model systems, and the one or more second redefined predictive model systems. Additionally, the system may identify the at least two highest rank loan program recommendations associated with one or more of the plurality of loan tiers. In some embodiments, the one or more predictive model systems may further include the use of gradient boosting models.

In another aspect, a method of providing optimized loan program recommendations to a dealership system is disclosed. The method may include determining a current dealership state for each dealership system of a plurality of dealership systems. Each of the dealership systems may be associated with the dealership and the current dealership state may be based on one or more predictive model systems. Further, the current dealership state may be associated with one of a plurality of customized loan tiers. The method may include transmitting one or more loan program recommendations to each of the dealership systems based on the one or more predictive model systems and the current dealership state of each of the dealership systems. The method may include receiving a first selection of a loan program from at least a first dealership system of the plurality of dealership systems. The first selection may be used to update model data representing auto finance dealership behavior. The method may further include redefining the one or more predictive model systems based on the updated model data, and determining a next dealership state for at least the first dealership system based on at least the one or more predictive model systems.

In some embodiments, the one or more loan program recommendations are identified by storing each loan program recommendations using the one or more predictive model systems and identifying the one or more highest rank loan program recommendations associated with the customized loan tier. In some embodiments, the one or more predictive model systems may include a dealership risk predictive model, a geographic model, and a prime loan eligibility model. In some embodiments, the prime eligibility model is based at least in part on a contract pull-through rate predictive variable.

In some embodiments, the next dealership state of each dealership system may be associated with the second customized loan tier and the current dealership state of each dealership system may be associated with the first customized loan tier. In some embodiments, the one or more predictive model systems may further include the use of gradient boosting models.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
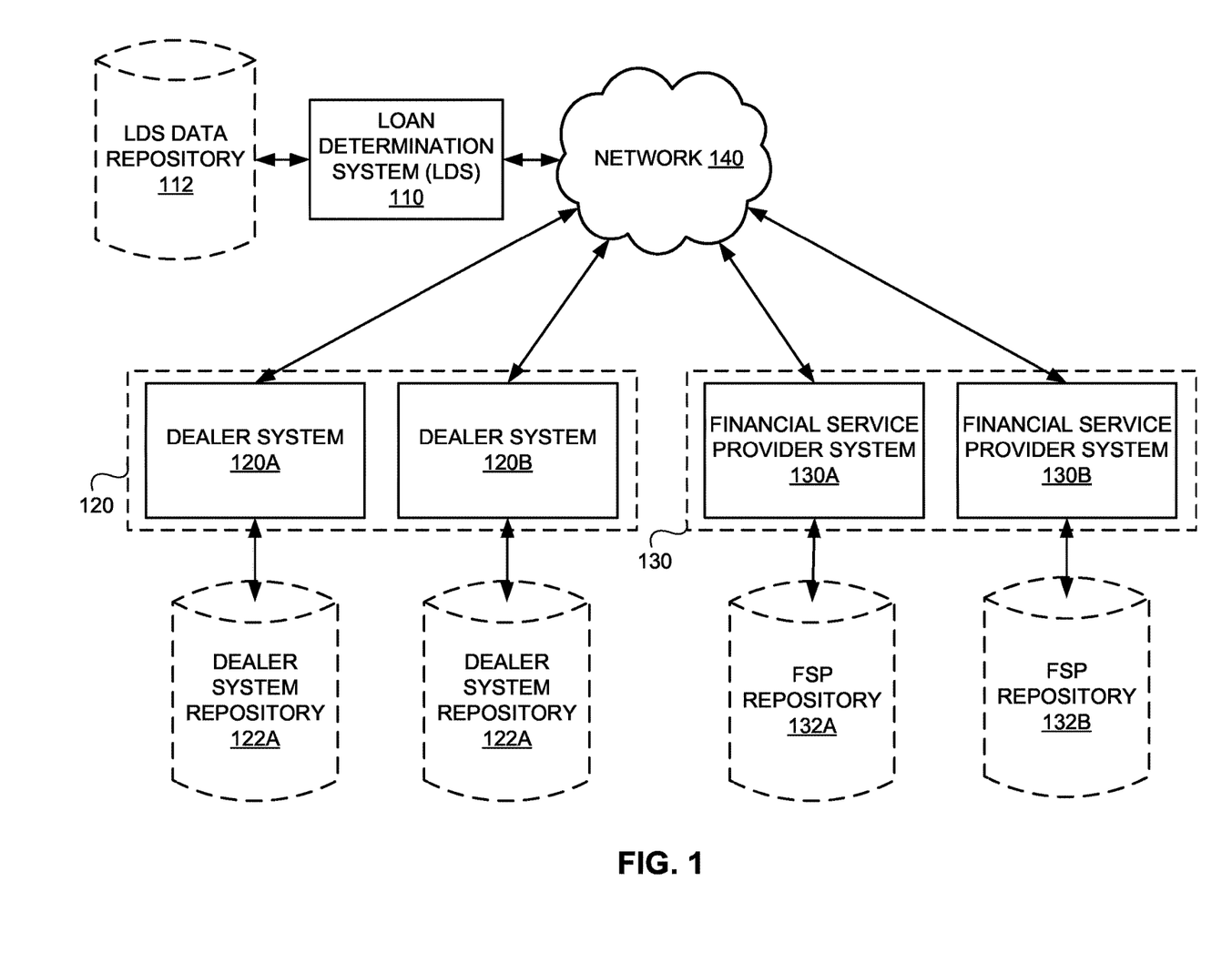
FIG. 1 illustrates an exemplary loan determination system consistent with disclosed embodiments.

FIG. 1 illustrates an exemplary system 100 consistent with the disclosed embodiments. In one aspect, as shown, system 100 may include a loan determination system 110, a loan determination system data repository 112, one or more dealership systems 120 (each of the dealership systems being referred to individually as 120A, 120B, etc.), one or more dealership system repositories 122 (each repository being referred individually to as 122A, 122B, etc.), one or more financial service provider systems 130 (each of the one or more financial service provider systems being referred to individually as 130A, 130B, etc.), one or more financial service provider repositories 132 (each financial service provider repository being referred to individually as 132A, 132B, etc.), and a network 140. In some embodiments, the loan determination system 110 may operate in conjunction with the one or more dealership systems 120 and the one or more financial service provider systems 130 to provide customized loan program recommendations to the one or more dealership systems 120 via the network 140 based on model data received from the one or more dealership system repositories 122 and the one or more financial service provider repositories 132.

In some embodiments, a loan determination system 110 may host its own model data (e.g. using the loan determination system data repository 112). In some embodiments, a loan determination system 110 may use the received model data to build one or more predictive model systems based on one or more predictive variables. The loan determination system 110 may use the one or more predictive model systems to identify a dealership as belonging to one of a plurality of loan tiers by identifying a dealership state associated with the dealership, indicative of which loan tier of a plurality of loan tiers a dealership is associated with at a particular point in time based on model data, the one or more predictive model systems, and the one or more predictive variables. After the loan determination system 110 has identified the current dealership state and the associated loan tier for a dealership, the loan determination system 110 may identify one or more loan program recommendations associated with the loan tier using the one or more predictive model systems and the current dealership state of the dealership system. The loan determination system 110 may be further configured to transmit the loan program recommendation to the dealership system and receive a selection of a loan program from the dealership based on the loan program recommendation. The selection may be used to update the model data, and the model data may be used to redefine the one or more predictive model systems, allowing the loan determination system 110 to take into account progressive changes within a dealership indicating the financial health of the dealership by determining a next dealership state of the dealership, where the next dealership state of the dealership may be associated with an alternate loan tier of the plurality of loan tiers. A dealership being placed into the alternate loan tier by the loan determination system 110 may indicate that the dealership's financial performance associated with offered loan programs has changed, and that the one or more predictive model systems have determined that loan programs associated with the alternate loan tier now make for optimal recommendations to the dealership system based on the next dealership state.

The loan determination system 110 may include one or more components that perform processes consistent with the disclosed embodiments. For example, the loan determination system 110 may include one or more computers (e.g., servers, database systems, etc.) configured to execute software instructions programmed to perform aspects of the disclosed embodiments, such as processing information relating to the loan recommendation identification (e.g., model data) that may be received from the one or more dealership system repositories 122, and the one or more financial service provider repositories 132. The loan determination system 110 may also be configured to execute stored software instructions to provide prospective dealers requiring a selection of loan programs to offer their potential customers, customized loan program recommendations based on the dealership state and an associated loan tier.

In some embodiments, the loan determination system 110 may include one or more predictive model systems, such as the prime eligibility model system, the dealer risk model system, and the geographical model system. Each of the one or more predictive model systems may be determined based at least in part on the received model data and one or more predictive model variables. Each of the predictive model systems may be based off distinct predictive model variables. For example, the prime eligibility model system may indicate the relative eligibility a dealership system has for loan program recommendations corresponding to prime loans. The prime eligibility model may be based at least in part on received model data and predictive model variables such as a financial service provider contract pull through rate, a financial service provider application approval rate, a dealership franchise type, a maximum warranty rate, and a maximum front-end rate. The dealer risk model system may be based at least in part on a dealership's share of prime loans as compared to their share of subprime loans, the financial service provider application approval rate, the geographic location a dealer is in (e.g., the state in which the dealership operates), and the average loan to value of the vehicles purchased under the loan programs offered by the dealership. The geographic model may be based at least in part on predictive variables such as the financial service provider market share in a particular region, a local auto sales tax rate, a local sales price to book value ratio of vehicles purchased, and a local backend product penetration.

The loan determination system data repository 112 may be associated with the promotional aggregator system 110, and in some embodiments, the loan determination system data repository 112 may store inventory listings of all the vehicles available for purchase or lease on the system 100.

The dealership system 120 may represent a system associated with a dealership seeking to provide a loan program through one or more financial service provider systems 130 to prospective customers wishing to purchase a vehicle. Each dealership system 120 may include a dealership system repository 122, which may be used to store model data (e.g., various statistics representative of a dealer's loan programs offered to prospective buyers). The dealership system 120 may include one or more components that perform processes consistent with the disclosed embodiments. For example, the dealership system 120 may include one or more computers (e.g., servers, database systems, etc.) that are configured to execute software instructions programmed to perform aspects of the disclosed embodiments.

The financial service provider system 130 may represent a system associated with a financial service provider seeking to provide loan programs or loan packages to dealerships seeking prospective customers for a vehicle purchase. Each financial service provider system 130 may include a financial service provider system repository 132, which may be used to store statistics representative of offered loan package performance (e.g., model data). The financial service provider system 130 may include one or more components that perform processes consistent with the disclosed embodiments. For example, the financial service provider system 130 may include one or more computers (e.g., servers, database systems, etc.) that are configured to execute software instructions programmed to perform aspects of the disclosed embodiments.

Facilitating communication between components of the system 100, the network 140 may be of any suitable type, including individual connections via the Internet such as cellular or WiFi networks. In some embodiments, the network 160 may connect terminals, services, and mobile devices using direct connections such as radio-frequency identification (RFID), near-field communication (NFC), Bluetooth™, low-energy Bluetooth™ (BLE), WiFi™, Ethernet, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
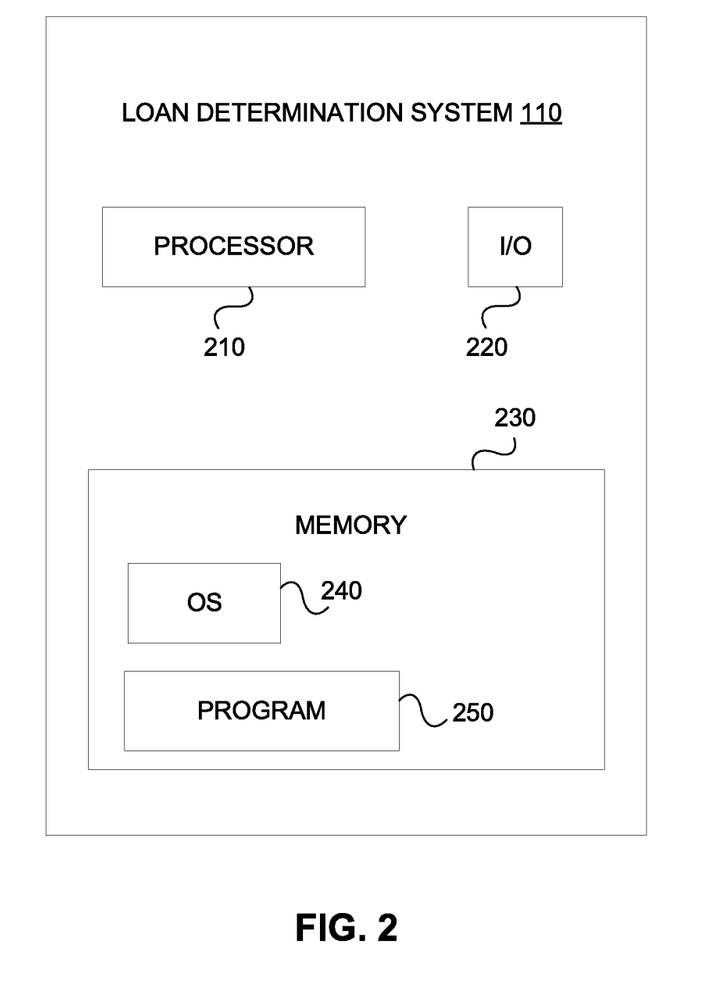
FIG. 2 is a component diagram of an exemplary loan determination system.

Components of the loan determination system 110 are shown in more detail in FIG. 2. The one or more dealership systems 120 and the one or more financial service provider systems 130 may have a similar structure and components that are similar to those described with respect to the loan determination system 110. As shown, the loan determination system 110 may include a processor 210, an input/output ("I/O") device 220, a memory 230 containing an operating system ("OS") 240, and a program 250. For example, the loan determination system 110 may be a single server or may be configured as a distributed computer system including multiple servers or computers that interoperate to perform one or more of the processes and functionalities associated with the disclosed embodiments. In some embodiments, the loan determination system 110 may further include a display (or a display interface), a peripheral interface, a transceiver, a mobile network interface in communication with the processor 210, a bus configured to facilitate communication between the various components of the loan determination system 110, and a power source configured to power one or more components of the loan determination system 110. A display may include any conventional display mechanism such as a flat panel display, projector, or any other display mechanism known to those having ordinary skill in the art. In some embodiments, a display, in conjunction with suitable stored instructions, may be used to implement a graphical user interface. In other embodiments, a display may include a display interface configured to receive or communicate with one or more external displays. The loan determination system 110 may further include a sound interface, a camera interface, a telephony subsystem, an antenna interface, and a GPS receiver.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

In some embodiments, a transceiver may be configured to communicate with compatible devices and ID tags when they are within a predetermined range. A transceiver may be, for example, compatible with one or more of: radio-frequency identification (RFID), near-field communication (NFC), Bluetooth®, low-energy Bluetooth® (BLE), WiFi™, ZigBee®, ambient backscatter communications (ABC) protocols or similar technologies.

A mobile network interface may provide access to a cellular network, the Internet, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

The processor 210 may be one or more known processing devices, such as a microprocessor from the Pentium™ family manufactured by Intel™ or the Ryzen™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. In another embodiment, the processor 210 may include a multiple-core processor arrangement (e.g., dual or quad core) that is configured to provide parallel processing functionalities to allow the loan determination system 110 to execute multiple processes simultaneously. One of ordinary skill in the art would understand that other types of processor arrangements could be implemented that provide for the capabilities disclosed herein.

The loan determination system 110 may include one or more storage devices configured to store information used by processor 210 (or other components) to perform certain functions related to the disclosed embodiments. In one example, the loan determination system 110 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the loan determination system 110 includes memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, the loan determination system 110 may include memory 230 that may include one or more programs 250 to perform one or more functions of the disclosed embodiments. Moreover, processor 210 may execute one or more programs 250 located remotely from the loan determination system 100. For example, the system 100 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft SQL databases, SharePoint databases, Oracle™ databases, Sybase™ databases, or other relational databases. Memory 230 may include software components that, when executed by processor 210, perform one or more processes consistent with the disclosed embodiments.

The loan determination system 110 may also be communicatively connected to one or more memory devices (e.g., loan determination system data repository 112 (not shown)) locally or through a network (e.g., network 140). The remote memory devices may be configured to store information and may be accessed and/or managed by the loan determination system 110. By way of example, the remote memory devices may be document management systems, Microsoft SQL database, SharePoint databases, Oracle™ databases, Sybase™ databases, or other relational databases. Systems and methods consistent with disclosed embodiments, however, are not limited to separate databases or even to the use of a database.

The loan determination system 110 may also include one or more input/output (I/O) devices 220 that may comprise one or more interfaces for receiving signals or input from devices and providing signals or output to one or more devices that allow data to be received and/or transmitted by the loan determination system 110. For example, the loan determination system 110 may include interface components, which may provide interfaces to one or more input devices, such as one or more keyboards, mouse devices, touch screens, track pads, trackballs, scroll wheels, digital cameras, microphones, sensors, and the like, that enable the loan determination system 110 to receive data from one or more users. In other exemplary embodiments, the I/O devices 220 may serve as the sound interface and/or the camera interface to present information to a user and capture information from a device's environment including instructions from the device's user. As additional examples, input components may include an accelerometer (e.g., for movement detection), a magnetometer, a digital camera, a microphone (e.g., for sound detection), an infrared sensor, an optical sensor, and a GPS receiver.

In exemplary embodiments of the disclosed technology, the loan determination system 110 may include any number of hardware and/or software applications that are executed to facilitate any of the operations. In example implementations, one or more I/O interfaces facilitate communication between the loan determination system 110 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the loan determination system 110 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the loan determination system 110 may include a greater or lesser number of components than those illustrated.

Figure 3:
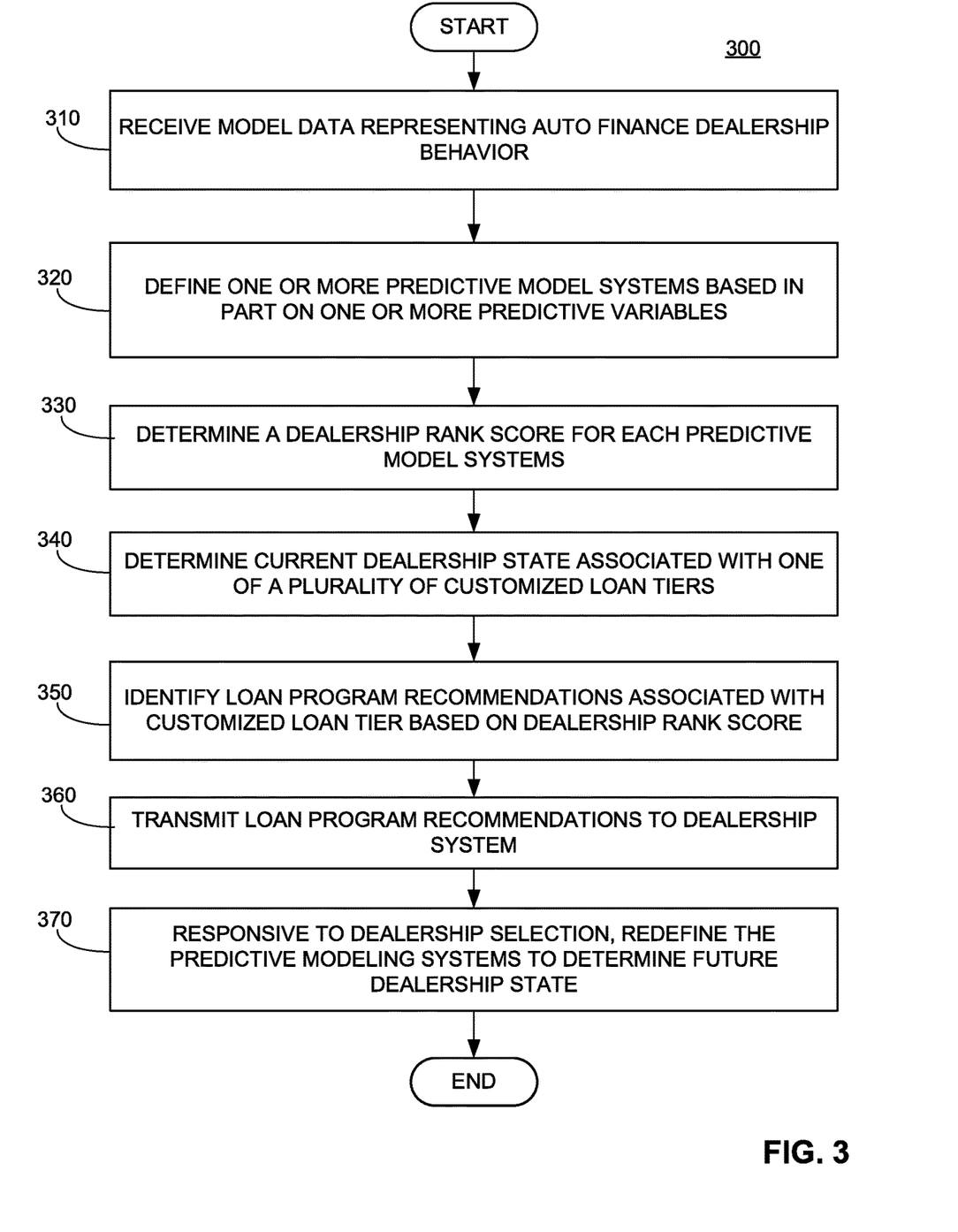
FIG. 3 is a flowchart of an exemplary method of using a loan determination system, according to an example embodiment.

FIG. 3 shows a flowchart of an exemplary method of using a loan determination system 110, according to an example embodiment. In block, 310, the system (e.g., the loan determination system 110) may receive, from one or more of a dealership system 120 and a financial service provider system 130, model data representing auto finance dealership behavior. The auto finance dealership behavior may include factors including the one or more predictive variables (e.g., a financial service provider contract pull-through rate, a financial service provider application approval rate, a maximum warranty rate, a dealership franchise type, a maximum frontend rate, a dealer prime/subprime share, a dealership location, an average loan to value of vehicles purchased at the dealership, and local factors). The model data may be stored by the dealership system repositories 122 and the financial service provider system repositories 132 and received by the loan determination system 110 to be stored in the loan determination system data repository 112.

In block 320, the system (e.g., the loan determination system 110) may define one or more predictive model systems based in part on one or more predictive variables. Exemplary predictive model systems may include a prime eligibility model system, a dealer risk model system, and a geographical model system. Exemplary predictive variables associated with the prime eligibility model system may include a financial service provider contract pull through rate, a financial service provider application approval rate, a maximum warranty rate, a franchise type, and a maximum front-end rate. A financial service provider contract pull through rate may be a measurement of the number of customers purchasing a particular loan product offered by the financial service provider divided by the number of customers initially interested in the particular loan product. A financial service provider application approval rate may be a measurement of how many of the customers seeking a loan product are ultimately approved for the loan product being offered. A maximum warranty rate may include a measurement of overall risk to the financial service provider. A maximum front-end rate may relate a variable that indicates what portion of a potential customers income is allocated to rate payment of the loan. Exemplary predictive variables associated with the dealer risk model system may include the respective shares of prime and subprime loans offered by a dealership, the state in which the dealer is located, the approval rate for loan packages offered at the dealership, and the average loan to value ratio of products sold at the dealership. Exemplary predictive model variables of the geographic model system may include local financial service provider market share, a local auto sales tax rates, local sales price to book value ratio, and local backend product penetration. Local backend product penetration may include a rating associated with the success a dealership has with selling financial products associated with the purchase of the vehicle.

In block 330, the system (e.g., promotional aggregator system 110) may determine a dealership rank score for each of the predictive model systems. The dealership rank score may take into account all factors of the one or more predictive model systems. For example, the dealership rank score may be a weighted average of the dealership rank score for each of the predictive model systems. The one or more predictive model systems may rank each dealership according to the specific criteria determined by the system to be most indicative of risk for a financial service provider to offer various loan products at each dealership. In some embodiments, the system may to give more weight to one of the one or more predictive model variables than to others, and in other embodiments the system may give more weight to one of the predictive model systems than to others when calculating a dealership rank score for more than one dealership.

In block 340, the system may determine a current dealership state associated with one of a plurality of customized loan tiers. For example, the system may associate every loan product offered by one or more financial service providers into one of a plurality of customized loan tiers. For example, and A level loan tier may correspond to loans that a financial service provider would offer to the dealerships associated with the least amount of risk of non-repayment. Further, the system may define one or more loan tiers including a B level, C level, D level, etc. Each of these loan tiers may correspond to loan packages associated with an increasing amount of risk of nonrepayment, with D level being associated with more risk than C level and so on. Based on the determinations of the one or more predictive model systems giving a dealership rank score for each dealership system may determine a current dealership state, indicative of the overall financial risk that a financial service provider would incur for offering particular loan products at each dealership. The current dealership state may be a function of time, meaning that the current dealership state may change over time as the dealerships continue to offer loan products and the model data is continually updated. In some embodiments, a current dealership state may be determined based on a dealer business model clustering model. For example, a dealership's current dealership state may be determined based on common patterns of behaviors in comparable dealerships. A comparable dealership may be one which has a similar business model (e.g., two dealerships with a low average LTV ratio may be comparable dealerships).

In block 350, the system (e.g., a loan determination system 110) may identify loan program recommendations associated with the customized loan tier determined for each of the one or more dealership systems. For example, the loan determination system 110 may make this determination based on the dealership rank score of the one or more dealerships. In some embodiments, the dealership rank score may be determined by more than one input. For example, the dealership rank score may include a risk ranking score as well as dealership segmentation based on the one or more loan tiers as determined in block 340. Further, the dealership rank score may also be determined in part by a conversion prediction based on past dealership behavior compared to the dealership behavior of comparable dealerships. The loan program recommendations associated with one or more of a plurality of customized loan tier may be received as part of the model data of block 310.

In block 360 the system may transmit the loan program recommendations to the one or more dealership systems. For example, the system may transmit the loan program recommendations via the network 140 to the one or more dealership systems. The loan program recommendations may include a ranking of each of the loan program recommendations corresponding to the loan tier determined for the dealership.

In block 370, the system (e.g., via the loan determination system 110) responsive to a dealership selection of one of the loan program recommendations, may update the model data and redefine the one or more predictive model systems to determine a future dealership state. For example, as a dealership offers loan products for vehicle purchases, the model data for the dealership is updated and stored (e.g., via dealership system repository 122) with the selection and the results of the transaction (e.g., whether a customer has defaulted on the loan, whether the customer has missed any monthly payments, etc.). The updated model data may be received by the system and stored via the loan determination system data repository 112.

Figure 4:
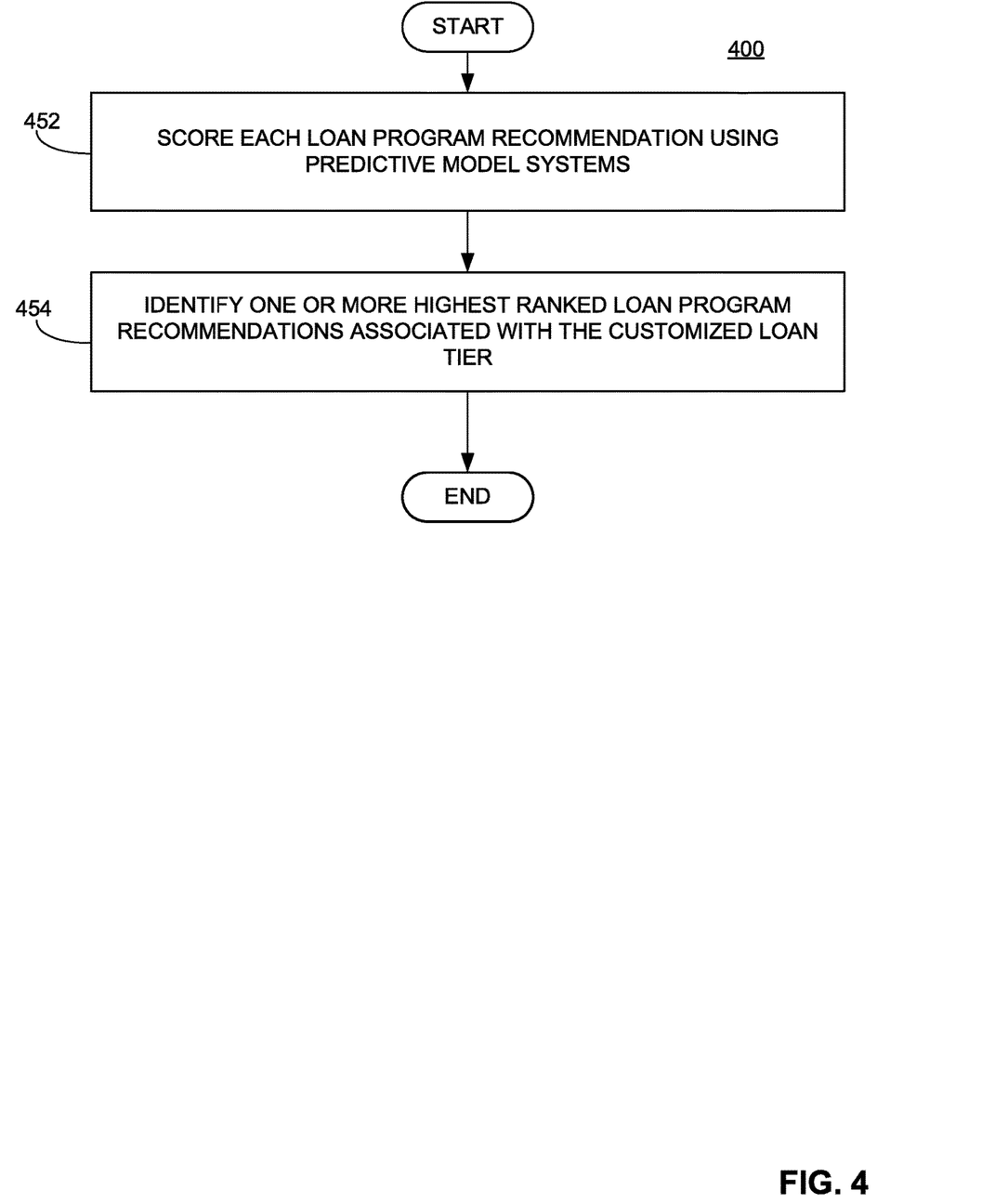
FIG. 4 is a flowchart of an exemplary method of identifying loan program recommendations based on current dealership state and an associated loan tier based on dealership rank score.

FIG. 4 shows a flowchart of an exemplary method of identifying loan program recommendations to be transmitted as part of using the determined dealership rank score of each dealership in block 350 according to some exemplary embodiments (e.g., according to the determined current dealership state of a dealership associated with a customized loan tier, the system may identify loan program recommendations associated with the customized loan tier).

In block 452, the system (e.g., the loan determination system 110) may be further configured to score each loan program recommendation using the one or more predictive model systems. For example, after the system has determined a current dealership state and associated customized loan tier, the system may score each loan program recommendation according to the one or more predictive model systems in order to determine which loan program recommendations correspond to each of the customized loan tiers. In some embodiments, each loan program recommendation may be associated with only one of the plurality of loan tiers, while in other embodiments, each loan program recommendations may be associated with one more of the plurality of loan tiers. For example, each of the predictive model systems (e.g., the prime eligibility model system, the dealer risk model system, and the geographical model system) may score each loan program recommendation according to a function including the predictive model variables (e.g., a financial service provider contract pull through rate, a financial service provider application approval rate, etc.).

In block 454, the system (e.g., loan program determination system 110) may identify one or more highest ranked loan program recommendations associated with the customized loan tier associated with each of the one of more dealership systems. For example, the one or more predictive model systems may identify the highest three ranked loan recommendations associated with an A tier of the plurality of loan tiers, and may provide the highest three ranked loan program recommendations to a dealership for selection.

Figure 5:
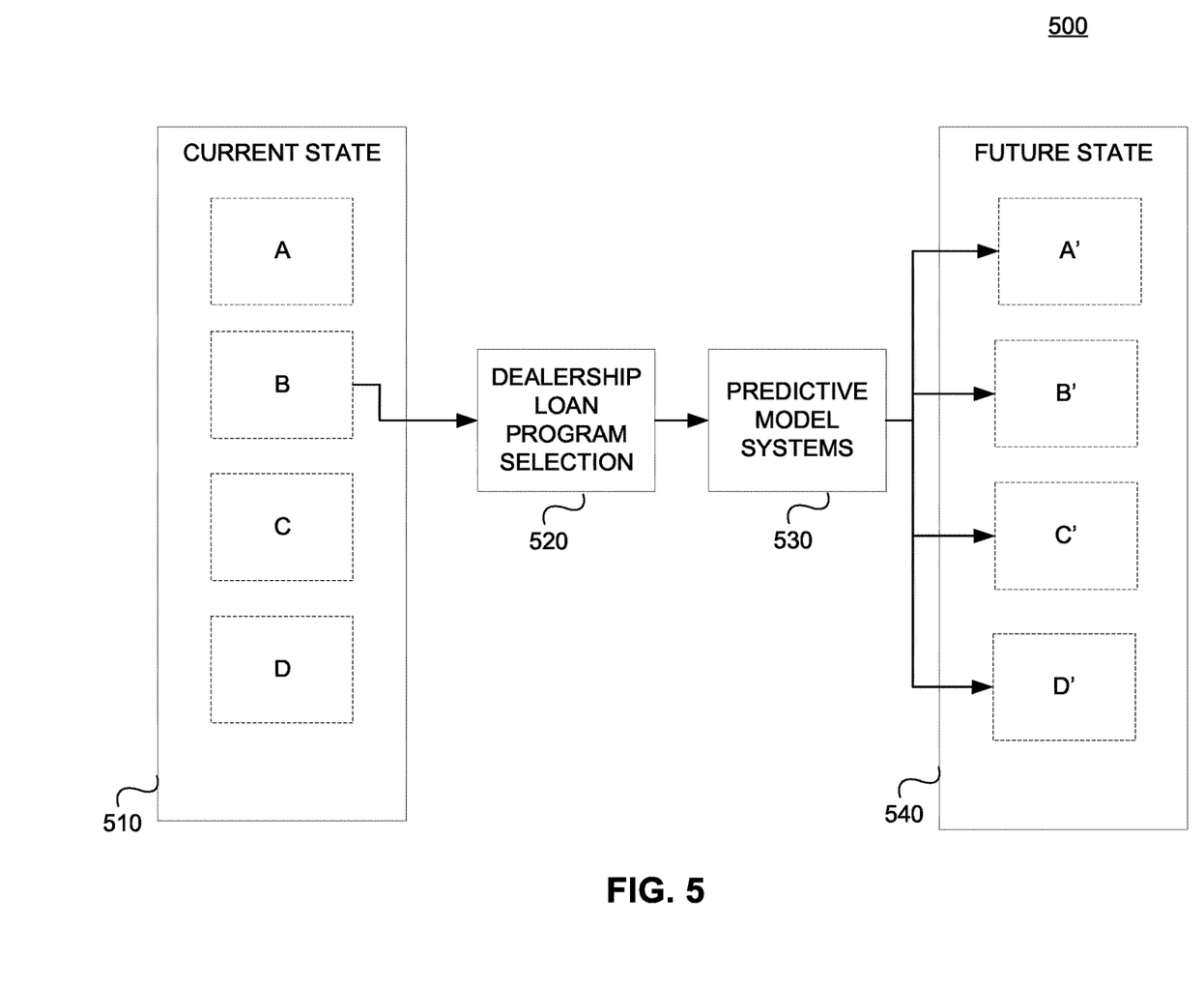
FIG. 5 is a flowchart of an exemplary method of providing a next dealership state based on the current dealership state, a dealership loan program selection, and one or more redefined predictive model systems, according to an example embodiment.

FIG. 5 shows a flowchart of an exemplary flowchart of determining a current dealership state of the one or more dealerships, and determining a next (e.g., future) dealership state based on a dealership loan program selection, and redefining the one or more predictive model systems with updated model data, which may be included as part of identifying loan program recommendations associated with one of a plurality of customized loan tiers in block 350 according to some exemplary embodiments (e.g., the loan program recommendations may include updated model data including the latest dealership selection of which loan program recommendation to offer to potential customers).

In block 510, the loan determination system 110 may determine a current dealership state in accordance to the method 300. For example, the system may receive model data representing auto finance dealership behavior (e.g., what loan program recommendations are offered, what percentage of the loan programs are accepted by potential customers of the dealerships, how many backend financial products are sold in tandem with the loan program associated with the purchase, etc.). The system may further determine a dealership rank score for each of the predictive model systems.

In block 520, the one or more dealerships may select one of the one or more recommended loan program selection. For example, the system may determine the top three loan program recommendations associated with the customized loan tier of the current dealership state. A dealership system may initially be ranked in a first loan tier (e.g., tier A), and after the dealership loan program selection, the updated model data may be received by the system and stored (e.g. via the loan determination system data repository 112) before redefining the predictive model systems to account for the updated model data.

In block 530, the model data may be updated in response to the dealership loan program selection 520. The predictive model systems may be redefined to account for the updated model data, which may correspond to auto dealership finance behavior. For example, the predictive model systems (e.g., via the prime eligibility model system, the dealer risk model system, and the geographical model system) may determine that a dealership system has a new rank score, and may now be associated with a next (future) dealership state, which corresponds to an alternate loan tier of the plurality of loan tiers.

For example, in block 540 the dealership may move from loan tier A associated with the current state of the dealership to a future state of the dealership associated with loan tier B. Further, in some embodiments, the behavior of a second dealership (e.g., via dealership loan program selection 520) may affect the future state of a first dealership. For example, as the one or more predictive model systems receive updated model data to redefine the predictive model systems, the redefined predictive model systems may determine a dealership rank score for both a first and a second dealership based on a dealership loan program selection 520 of only a first dealership, because the predictive model systems may determine new weights for the one or more predictive variables for the redefined predictive model systems.

Exemplary Use Case

The following exemplary use case describes just one example of a typical user flow pattern. It is intended solely for explanatory purposes and not in limitation. It should be noted that in some embodiments, the loan determination system 110 may be the system that hosts the model data with the data corresponding to these dealership financial behaviors being stored on the loan determination system data repository 112. In other embodiments, the dealership systems 120 may host the model data. In yet other embodiments, the model data may be directly hosted by the financial service provider systems 130. These embodiments function substantively in the same manner, so in describing an example where the dealership systems 120 hosts the model data, a person having ordinary skill in the art would understand that which of the dealership systems 120, financial service provider systems 130, or the loan determination system 110 hosts the model data may be freely interchangeable without substantively effecting the methods or systems disclosed herein. When the inventory is hosted by the loan determination system 110 (e.g., via loan determination system data repository 112), the system may receive model data associated automotive dealership financial behavior from the dealership systems 120 and the financial service provider systems 130. When the inventory is not hosted by the promotional aggregator system 110 (e.g., when the inventory is hosted by either the dealership systems 120 or the financial service provider systems 130), the system may first receive model data associated auto finance dealership behavior before defining one or more predictive model systems.

First, a customer may wish to acquire (e.g., purchase or lease) a vehicle at a dealership. Each dealership may operate a dealership system, which records financial data including model data associated with auto finance dealership behavior. In some embodiments, auto finance dealership behavior may be collected by financial service provider representatives in the field that may observe, categorize, and capture dealership level operating procedures into a recording system (e.g., a financial service provider representative may determine whether a dealership negotiates the sale price of vehicles with customers, and this information may recorded in an LDS repository 112, dealer system repository 122, and/or financial service provider repository 132). Auto finance dealership behavior may include how many customers have been approved out of the number inquiring to purchase a vehicle with a loan product offered by either the dealership, or a partnered financial service provider. Auto finance dealership behavior may also include the percentage of customers who have either missed a payment or defaulted on a loan product associated with the purchase of a vehicle at the dealership. Similarly, model data may be stored by the financial service providers offering the loan products associated with the purchase of a vehicle at the dealership.

Each customer interaction may be added to the model data stored by one of the dealership systems 120, the financial service provider systems 130, or the loan determination system 110. The system (e.g., via loan determination system 110) may receive the model data representing auto finance dealership behavior. The model data may be processed to determine one or more predictive variables, which may be used to define one or more predictive model systems based in part on the one or more predictive variables. For example, once the loan determination system 110 receives geographic data such as a local market share for a financial service provider, a local auto sales tax rate, a local backend product penetration, and a local price to book value ratio, the system may then define the geographic model system using predictive variables based in part on the geographic data. The system may perform similar operations for the remaining predictive model systems. Once all the predictive model systems have been defined based on the received model data, the system may determine a dealership rank score for each of the predictive model systems. In some embodiments, a weighted average of the results of all the predictive model systems may be used to assign the ultimate dealership rank score.

The loan determination system 110 may further determine a current dealership state associated with one of a plurality of customized loan tiers, which may be based on the ultimate dealership rank score. The current dealership state may be associated with one of a plurality of loan tiers (e.g., A level, B level, C level, D level, etc.), which may correspond to the overall risk a financial service provider may incur by offering a particular loan product on a vehicle purchase at a dealership as well as the expected pull-through rate for a dealership given a specific loan offer. In some embodiments, the loan determination may determine a current dealership state based on optimizing both for risk management and for capture (i.e., pull through) rate. Once the current dealership state is determined, the system may identify loan program recommendations associated with the customized loan tier. The customized loan tier may be based in part on the dealership state and the dealership rank score. For example, a dealership with a low average LTV ratio may correspond to a higher rank dealership rank score, and may be placed in an A level customized loan tier based on the overall low risk a financial service provider would incur by offering a loan product to a patron of the respective dealership for purchasing a vehicle.

Dealerships may offer customers loan products based on the identified loan program recommendations. Accordingly, the system (e.g., loan determination system 110) may transmit the loan program recommendations to the dealership system (e.g., to a dealership system 120A, 120B, etc.). Potential customers of the dealerships may choose one of the identified loan program recommendations. In response to the selection, the system may update the model data stored either locally at the dealership system 120 (via dealership system data repository 122) or at the financial service provider system 130 (via financial service provider system data repository 132), or the system may receive the updated model data at the loan determination system 110 for storage by the loan determination system data repository 112. Once the model data is updated, the system may redefine the one or more predictive model systems to incorporate the new model data into the decision-making process. Finally, the system may determine a next dealerships state which may be associated to the same or a different alternate customized loan tier for each of the one or more dealerships based on the one or more redefined predictive model systems, and identify loan program recommendations associated with the alternate customized loan tier.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A loan determination system for providing optimized loan program recommendations, the system comprising:
   one or more processors; and
   a memory in communication with the one or more processors and storing instructions that, when executed by the one or more processors, are configured to cause the loan determination system to:
      receive, from one or more source systems, model data representing auto finance dealership behavior;
      define one or more predictive model systems that employ an initial weighting scheme to one or more predictive variables;
      determine a current dealership state of a first dealership system associated with a first dealership based on the one or more predictive model systems, the current dealership state of the first dealership system associated with a first loan tier of a plurality of loan tiers;
      identify one or more loan program recommendations associated with the first loan tier based on the one or more predictive model systems and the current dealership state of the first dealership system;
      transmit the one or more loan program recommendations to the first dealership system;

receive a first selection of a loan program from the first dealership;

update the model data based on the first selection to form first model data;

update the one or more predictive model systems based on the first model data to form one or more first updated predictive model systems that employ a first updated weighting scheme to the one or more predictive variables;

determine a next dealership state of the first dealership system based on the one or more first updated predictive model systems, the next dealership state of the first dealership system being associated with an alternate first loan tier of the plurality of loan tiers;

determine a current dealership state of a second dealership system associated with a second dealership based on the one or more first updated predictive model systems, the current dealership state of the second dealership system is associated with the first loan tier of the plurality of loan tiers;

identify one or more loan program recommendations associated with the first loan tier based on the one or more first updated predictive model systems and the current dealership state of the second dealership system;

transmit the one or more loan program recommendations to the second dealership system;

receive a second selection of a loan program from the second dealership;

update the first model data based on the second selection to form second model data;

update the one or more first updated predictive model systems based on the second model data to form one or more second updated predictive model systems that employ a second updated weighting scheme to the one or more predictive variables, wherein the one or more predictive model systems, one or more first updated predictive model systems, and one or more second updated predictive model systems each comprise (i) a dealership risk predictive model that is based at least in part on one or more variables comprising an approval rate for loan packages offered by the first dealership and an average loan to value ratio of products sold by the first dealership, (ii) a geographic model that is based at least in part on one or more variables comprising local auto sales tax rates, and (iii) a prime loan eligibility model that is based at least in part on one or more variables comprising a financial service provider contract pull through rate; and determine a next dealership state of the second dealership system based on the one or more second updated predictive model systems, the next dealership state of the second dealership system being associated with an alternate second loan tier of the plurality of loan tiers.

2. The system of claim 1, wherein:
the dealership risk predictive model is further based at least in part on one or more variables comprising respective shares of prime and subprime loans offered by the first dealership and a geographic location of the first dealership;

the geographic model is further based at least in part on one or more variables comprising local financial service provider market share, local sales price to book value ratio, and local backend product penetration; and the prime loan eligibility model is further based at least in part on one or more variables comprising a financial service provider application approval rate, a maximum warranty rate, a franchise type, and a maximum front-end rate.

3. The system of claim 1, wherein the prime eligibility model is based at least in part on a contract pull-through rate predictive variable.

4. The system of claim 1, wherein the next dealership state of one or more of the first and the second dealership systems is based at least in part on which loan program the dealership selects.

5. The system of claim 1, wherein determining a current dealership state further comprises determining a dealership rank score for each of the one or more predictive model systems, and the one or more first updated predictive model systems, the current dealership state determined based in part on the dealership rank score for each of the one or more predictive model systems.

6. The system of claim 5, wherein determining the next dealership state of the one or more of the first and second dealership systems further comprises determining an updated dealership rank score for each of the one or more first updated predictive model systems, and the one or more second updated predictive model systems.

7. The system of claim 1, wherein the instructions, when executed by the one or more processors, are further configured to cause the system to:

determine a current dealership state of a third dealership system associated with a third dealership based on the one or more second updated predictive model systems, the current dealership state of the third dealership system associated with a third loan tier of the plurality of loan tiers;

identify one or more loan program recommendations associated with the third loan tier based on the one or more second updated predictive model systems and the current dealership state of the third dealership system;

transmit the one or more loan program recommendations to the third dealership system;

receive a third selection of a loan program from the third dealership;

update the second model data based on the third selection to form third model data;

update the one or more second updated predictive model systems based on the third model data to form one or more third updated predictive model systems that employ a third updated weighting scheme of the one or more predictive variables; and determine a next dealership state of the third dealership system based on the one or more third updated predictive model systems, the next dealership state of the third dealership system associated with the alternate first tier of the plurality of loan tiers.

8. A loan determination system, the system comprising:
one or more processors; and
a memory in communication with the one or more processors and storing instructions that, when executed by the one or more processors, are configured to cause the system to:
receive, from one or more source systems, model data representing auto finance dealership behavior;
define one or more predictive model systems that employ an initial weighting scheme to one or more predictive variables;

determine a dealership rank score of a first dealership system associated with a first dealership for each of the one or more predictive model systems;

determine a current dealership state of the first dealership system associated with the first dealership, the current dealership state determined based at least in part on the dealership rank score of the first dealership system, the current dealership state of the first dealership system associated with a first loan tier of a plurality of loan tiers;

identify at least two loan program recommendations associated with the first loan tier;

transmit the at least two loan program recommendations to the dealership system;

receive a selection of a loan program from the first dealership, the selection being used to update the model data representing auto finance dealership behavior;

update the one or more predictive model systems based on the model data to form one or more first updated predictive model systems that employ an updated weighting scheme to the one or more predictive variables;

determine an updated dealership rank score of the first dealership system associated with the first dealership; and determine a next dealership state of the first dealership system based at least on the updated dealership rank score and the one or more first updated predictive model systems, the next dealership state of the first dealership system being associated with an alternate second tier of the plurality of loan tiers.

9. The system of claim 8, wherein:

a dealership risk predictive model of the one or more predictive model systems is based at least in part on one or more variables comprising respective shares of prime and subprime loans offered by the first dealership, a geographic location of the first dealership, an approval rate for loan packages offered by the first dealership, and an average loan to value ratio of products sold by the first dealership;

a geographic model of the one or more predictive model systems is based at least in part on one or more variables comprising local financial service provider market share, local auto sales tax rates, local sales price to book value ratio, and local backend product penetration; and a prime loan eligibility model of the one or more predictive model systems is based at least in part on one or more variables comprising a financial service provider contract pull through rate, a financial service provider application approval rate, a maximum warranty rate, a franchise type, and a maximum front-end rate.

10. The system of claim 9, wherein the prime eligibility model is based at least in part on a contract pull-through rate predictive variable.

11. The system of claim 8, wherein the next dealership state of the dealership system is based at least in part on which loan program the dealership selects.

12. The system of claim 8, with further instructions stored on the memory causing the processor to:

determine a current dealership state of a second dealership system associated with a second dealership based on the one or more predictive model systems, the current dealership state of the second dealership system associated with a second loan tier of the plurality of loan tiers;

identify one or more loan program recommendations associated with the second loan tier based on the one or more predictive model systems and the current dealership state of the second dealership system;

transmit the one or more loan program recommendations to the second dealership system;

receive a selection of a loan program from the second dealership, the selection being used to update the model data representing auto finance dealership behavior;

update the one or more first predictive model systems based on the model data to form one or more second updated predictive model systems that employ a second updated weighting scheme to the one or more predictive variables; and determine a next dealership state of the second dealership system based on the one or more second updated predictive model systems, the next dealership state of the second dealership system associated with the alternate second tier of the plurality of loan tiers.

13. The system of claim 12, wherein the at least two loan program recommendations are identified by scoring each loan program recommendation using the one or more predictive model systems, the one or more first updated predictive model systems, and the one or more second updated predictive model systems, and identifying the at least two highest ranked loan program recommendations associated with one or more of the plurality of loan tiers.

14. The system of claim 13, wherein the one or more predictive model systems further comprise a use of gradient boosting models.

15. A method of providing optimized loan program recommendations to a dealership system, the method comprising:

determining a current dealership state for each dealership system of a plurality of dealership systems, each of the dealership systems being associated with a dealership, wherein the current dealership state is based on one or more predictive model systems that employ an initial weighting scheme to one or more predictive variables and associated with one of a plurality of customized loan tiers;

transmitting one or more loan program recommendations to each of the dealership systems based on the one or more predictive model systems and the current dealership state for each dealership system;

receiving a first selection of a loan program from at least a first dealership system of the plurality of dealership systems, the first selection being used to update model data representing auto finance dealership behavior;

updating the one or more predictive model systems based on the updated model data to form one or more updated predictive model systems that employ a first updated weighting scheme to the one or more predictive variables, wherein the one or more predictive model systems and the one or more updated predictive model systems each comprise (i) a dealership risk predictive model, (ii) a geographic model, and (iii) a prime loan eligibility model; and determining a next dealership state for at least the first dealership system based on at least the one or more updated predictive model systems.

16. The method of claim 15, wherein the one or more loan program recommendations are identified by scoring each loan program recommendation using the one or more predictive model systems and identifying one or more highest ranked loan program recommendations associated with the customized loan tier.

17. The method of claim 15, wherein:
- the dealership risk predictive model is based at least in part on one or more variables comprising respective shares of prime and subprime loans offered by the first dealership, a geographic location of the first dealership, an approval rate for loan packages offered by the first dealership, and an average loan to value ratio of products sold by the first dealership;
- the geographic model is based at least in part on one or more variables comprising local financial service provider market share, local auto sales tax rates, local sales price to book value ratio, and local backend product penetration; and
- the prime loan eligibility model is based at least in part on one or more variables comprising a financial service provider contract pull through rate, a financial service provider application approval rate, a maximum warranty rate, a franchise type, and a maximum front-end rate.

18. The method of claim 15, wherein the prime eligibility model is based at least in part on a contract pull-through rate predictive variable.

19. The method of claim 15, wherein the next dealership state of each dealership system is associated with a second customized loan tier and the current dealership state for each dealership system is associated with a first customized loan tier.

20. The method of claim 15, wherein the one or more predictive model systems further comprise a use of gradient boosting models.

\* \* \* \* \*